Sept. 30, 1930.  G. BAEKELAND  1,776,879
IMPREGNATED AND COATED FABRIC
Filed July 28, 1926
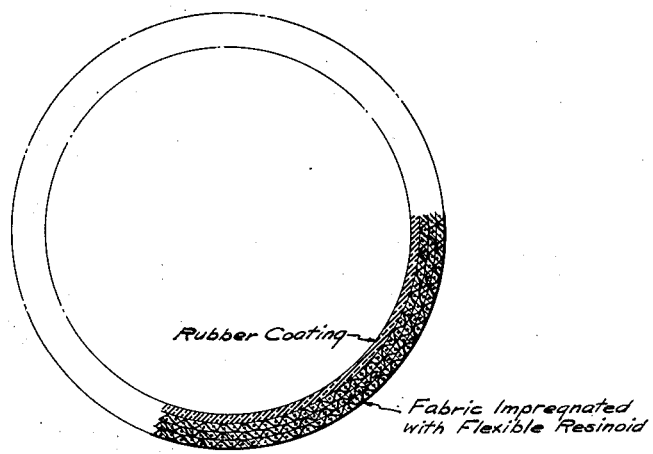

Patented Sept. 30, 1930

1,776,879

UNITED STATES PATENT OFFICE

GEORGE BAEKELAND, OF SCARSDALE, NEW YORK, ASSIGNOR TO BAKELITE CORPORATION, OF NEW YORK, N. Y., A CORPORATION OF DELAWARE

IMPREGNATED AND COATED FABRIC

Application filed January 28, 1926. Serial No. 125,595.

The present invention relates to rubber coated fabrics such as are largely used in the manufacture of automobile tires, belting, pressure hose or the like flexible articles; and comprises a novel fabric of this kind characterized by an increased tensile strength and better cohesion of the constituent fibrous materials and by insuring a better bond between the rubber and the fabric to which it is applied.

In the manufacture of automobile tires, belting, pressure hose and the like, certain types of insulation and similar articles, it has been customary heretofore to impregnate and coat the fabric with rubber or rubber solution. This treatment, properly carried out, effectually water-proofs the fabric but does not appreciably increase its tensile strength, and the adherence of the rubber is rather defective.

The figure illustrates one embodiment of my invention, as applied to a flexible fire hose, in a diagrammatic manner.

I have discovered that greatly improved results may be secured by initially impregnating the fabric with a flexible composition forming an intermediary bond and having, as compared with rubber solutions, superior penetrating characteristics, and then applying rubber composition, either as a plain coating or with the necessary mixtures and vulcanizing agents to be submitted afterwards to vulcanizing treatment. As a preliminary impregnating solution I prefer to use a varnish yielding a flexible film of the phenol-methylene resinoid type, such for example as the varnish disclosed in United States Patent No. 1,590,079, patented June 22, 1926, to L. C. Byck, although my invention is not limited to the use of this particular composition. Nevertheless, so far as my investigations have shown, the above mentioned effect of markedly increasing the tensile strength and wearing qualities of the fabric is peculiar to and characteristic of the flexible resinoids of the phenol-methylene type: the term "flexible resinoid" being used herein to designate the infusible transformation product of the reactive resins of the phenol-methylene type or other artificial resinoids, rendered flexible by any suitable method, of which that disclosed in the Byck patent above mentioned is only an example. Essentially similar results are secured when the resinoid is rendered flexible by any other plasticizing additions.

I ordinarily prefer to effect the hardening or polymerization of the reactive resin—its transformation to the resinoid state—in advance of the application of the rubber or rubber or rubber composition, inasmuch as the temperatures advantageously used to bring about transformation in the resinoid reaction, say 160°–170° C., are somewhat higher than those used in vulcanizing rubber. However, it is within the scope of my invention to apply the rubber over the reactive resin and subject the whole to vulcanizing conditions.

Referring now to the drawing, I have illustrated a flexible hose as one specific example of my invention. In the particular arrangement illustrated the body of the hose consists of a plurality of layers of fabric, such as canvas, impregnated with a flexible resinoid of the type herein described. This impregnated fabric is coated with rubber, or rubber composition, which may, of course, be applied to either or both sides of the impregnated fabric as desired, but is here shown as an interior coating, by way of example.

While my invention is chiefly concerned with the treatment of woven fabrics, and more particularly canvas in the case of automobile tires, belting, pressure hose and the like flexible articles, it will be understood that some of its advantages may be secured by applying the method to the treatment of other flexible fibrous materials such as cord, tape, felt, paper and the like: so that the term fabric is used herein in its broad sense to include flexible products fabricated from fibrous materials.

In the above specifications wherever reference is made to rubber the latter may be partly or entirely replaced by balata or gutta percha. Likewise, wherever reference is made to a resinoid I include all infusible synthetic resins embodying the same technical effect of easy penetration into the fabric and good bonding properties with the superimposed layer of rubber.

I have indicated as most available artificial resinoids those obtained from phenols and formaldehyde, but similar results may be obtained by replacing formaldehyde with other substances equivalent in their action, as for instance the polymers of formaldehyde, hexamethylenetetramine or other substances containing the active methylene group.

In the same way other artificial resins obtained from phenols, furfural and other aldehydes can be used, or the resinoids obtained from carbamid and formaldehyde, thiocarbamid or the polymerized resins resulting from the action of glycerol upon phthalic acid. Instead of glycerol polyglycerol may be used, and instead of phthalic anhydride I may use other organic acids of similar type, as for example succinic, maleic, or malic acids, or other mixtures. In all cases the resulting resin is of the glycerol phthalic anhydride type.

I claim:

1. As a new article of manufacture, a tire, belt, hose or other flexible article embodying a rubber-coated fabric, said fabric impregnated with a flexible resinoid.

2. As a new article of manufacture, a tire, belt, hose or other flexible article embodying a rubber-coated fabric, said fabric impregnated with a flexible resinoid of the phenol-methylene type.

3. In a method of making flexible rubber-coated articles, the steps comprising impregnating a fabric with a reactive phenol-methylene resin adapted to yield a flexible resinoid, transforming the reactive phenol-methylene resin into a flexible resinoid, and applying a coating of rubber thereto.

4. In a method of making flexible rubber-coated articles, the steps comprising impregnating a fabric with a reactive phenol-methylene resin adapted to yield a flexible resinoid, transforming the reactive phenol-methylene resin into a flexible resinoid, applying a coating of rubber thereto, and vulcanizing the latter.

In testimony whereof, I affix my signature.

GEORGE BAEKELAND.